United States Patent Office 3,519,923
Patented July 7, 1970

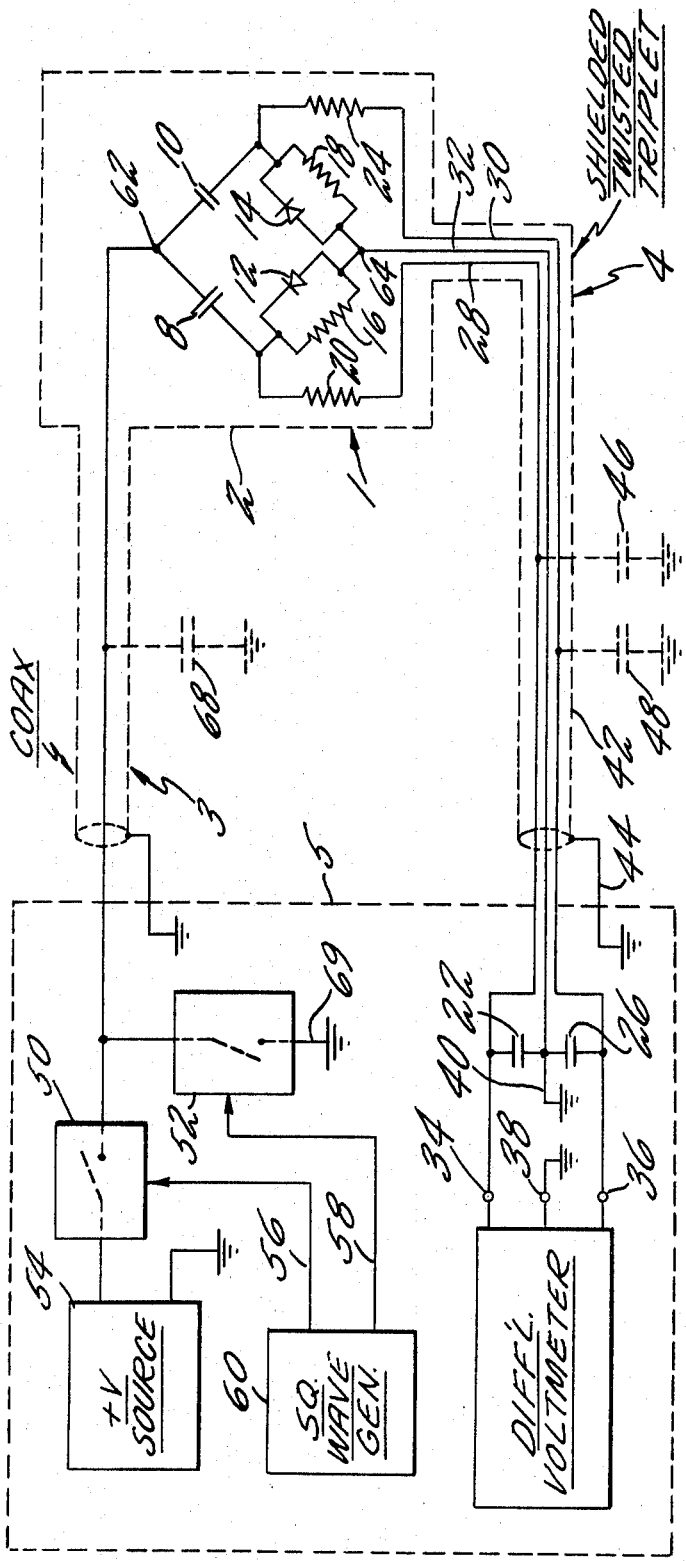

3,519,923
CAPACITIVE TRANSDUCER SYSTEM INDEPENDENT OF STRAY CAPACITANCE
Henry E. Martin, Wapping, Conn., assignor to United Aircraft Corporation, East Hartford, Conn., a corporation of Delaware
Filed Apr. 16, 1968, Ser. No. 721,677
Int. Cl. G01n 27/26
U.S. Cl. 324—61          4 Claims

ABSTRACT OF THE DISCLOSURE

A capacitive transducer, located remotely from control and monitoring circuitry therefor, is charged and discharged through a coaxial cable so arranged that the capacitance thereof is not in the transducer circuitry, and the output thereof is disposed relative to monitoring equipment so that the capacitance of the output cable is parallel with filter capacitance and not significant relative to the transducer capacitance being monitored.

BACKGROUND OF THE INVENTION

Field of invention

This invention relates to capacitive transducers, and more particularly to improved, low stray capacitance circuit arrangements therefor.

Description of the prior art

It is well known that fluid pressures can be monitored by measuring the varying capacitance of a pair of pressure responsive plates. Also, differential capacitors are well known as transducers of fluid pressure. Capacitors are also used in other forms of transducers such as sensors of position, temperature, force etc. Many forms of circuitry have been devised for monitoring the capacitance of a transducer so as to provide an indication of the pressure, or other perimeter, being sensed thereby. One of the greatest difficulties of capacitive transducers is the effect of circuitry and cabling which provide stray capacitance that limits the accuracy and resolution of capacitive transducers. Also, most capacitive transducers known to the prior art rely on the use of inductive coupling (such as transformers) to provide a workable circuit arrangement. However, the use of inductances precludes the formation of solid state circuitry, and particularly monolithic circuitry, for microminiaturized remote transducers. As the size of the circuitry increases, the difficulty of mitigating stray capacitance effects also increases. Additionally, weight and size are frequently a factor in providing transducers which can be physically located as necessary to monitor the desired effect.

SUMMARY OF INVENTION

The object of the present invention is to provide an improved capacitive transducer essentially independent of stray capacitance; another object of the present invention is to provide a transformerless capacitive transducer; a further object of the present invention is provision of a compact, lightweight capacitive transducer, and circuitry therefor.

In accordance with the present invention, the capacitance of a transducer forms two legs of a bridge, the other two legs providing unilateral impedance in the charge direction, the bridge output comprising filters.

The present invention virtually eliminates the effects of stray capacitance on cabling to a transducer which can be lightweight, manufactured in microcircuit form, and of relatively low cost.

Other objects, features and advantages of the present invention will become more apparent in the light of the following detailed description of a preferred embodiment thereof, as illustrated in the accompanying drawing.

BRIEF DESCRIPTION OF THE DRAWING

The sole figure herein comprises a schematic diagram of one embodiment of the present invention.

DESCRIPTION OF THE PREFERRED EMBODIMENT

Referring now to the figure, a transducer 1 is suitably disposed within a shielded enclosure 2 and connected by a coaxial cable 3 and a shielded, twisted triplet cable 4 to a shielded enclosure 5 housing the control circuitry for the transducer 1. The transducer 1 comprises a bridge connected to a filter, the legs of the bridge comprising a pair of capacitors 8 and 10, a pair of diodes 12 and 14, and a pair of resistors 16 and 18. The filter comprises a resistor 20 and a capacitor 22 as well as a resistor 24 and a capacitor 26. The output of the bridge, which provides the useful output of the transducer, is coupled over one line 28 of the output cable 4 between resistor 20 and capacitor 22, and another line 30 between resistor 24 and capacitor 26, as well as a ground line 32 between the base of the bridge 64 and ground (40, within the control unit 5). Each of the differential outputs transferred over the lines 28 and 30 are applied to respective terminals 34, 36 of a differential voltmeter which may also include a ground terminal 38. The capacitors 22, 26 are each connected to ground (40). A shield 42 of the cable 4 is connected to ground (44) within the control unit 5. As represented in phantom in the figure, each of the conductors 28, 30 has an effective capacitance to ground 46, 48 respectively. It is one of the features of this invention that the cable capacitances 46, 48 are simply in parallel with respective filter capacitances 22, 26. Thus, the capacitance of the cable 4 is fully mitigated by the present invention.

The input to the bridge of the transducer 1 via the coaxial cable 3 is controlled by a pair of alternatively operating switches 50, 52. The switch 50 selectively connects a positive voltage source 54 to the bridge 1 for charging the transducing capacitors 8, 10. The switch 52 alternatively shorts the bridge 1 to ground for the discharging of the transducing capacitors 8, 10. The operation of the switches 50, 52 is in response to alternative outputs 56, 58, respectively, of a square-wave generator 60 or other suitable control.

In operation, during a first time period, the square-wave generator 60 provides a signal over line 56 to close the switch 50 thereby connecting positive potential from the source 54 to a first point 62 connecting a first leg (8) and a second leg (10) of the bridge. This causes changing current to flow from the point 62 through the capacitors 8, 10 and through resistors 16, 18 to a ground point 64 at the base of the bridge. The charging rate is determined by the size of the resistors 16, 18 the size of the capacitors 8, 10 and the potential of the source 54. During this period of time, there is also a tendency for the current to flow into the output filters: that is, through resistors 20, 24 and into capacitors 22, 26 to ground 40. However, the resistors 16, 18 are chosen to be significantly smaller than the filter resistors 20, 24 and the filter capacitors 22, 26 are very large so that the charging effect of these capacitors is relatively small compared to the effect on capacitors 8, 10. This is more particularly true since all current flowing into the filter capacitors 22, 26 must flow through the capacitors 8, 10. Typically, for instance, the resistors 16, 18 may be on the order of magnitude of 2,000 ohms whereas the resistors 20, 24 may be on the order of the magnitude of 20,000 ohms.

The capacitors 22, 26 may be on the order of magnitude of 0.2 microfarad, and typical values of capacitance for the transducing capacitors 8, 10 may be on the order of magnitude of 20 to 200 $\mu\mu$fd. In the next cycle of operation, the square-wave generator 56 no longer sends the proper control signal through switch 50 so it opens, and a signal on line 58 causes the closing of switch 52. With switch 52 closed, the point 62 connected to ground through the coax 3 so that the capacitors 8, 10 discharge by current flow from the ground potential point 64 of the bridge through the diodes 12, 14. Note that the stray capacitance, represented by the capacitor 68 shown in phantom in the figure, is charged and discharged completely independently of the bridge 1. That is, when switch 50 is closed, the capacitor 68 charges directly to ground, and when switch 52 is closed the capacitor discharges directly through switch 50 to ground (69). There is no flow of current as a result of this capacitance in any portion of the bridge 1.

The switches 50, 52 have been shown schematically as any form of switch. These switches may comprise transistor switches or they may comprise diode quads suitably gated. Any form of switch having proper contact potentials, switching speeds, and so forth, may be chosen for a given implementation of the present invention. The nature of these switches is not germane to the present invention, and any number of well-known switches may be utilized in conjunction herewith.

The capacitors 8, 10 may either comprise a standard or reference capacitor in combination with a transducing capacitor, or the capacitors 8, 10 may comprise the two portions of a differential capacitor as is known in the art. In such a case, the point 62 is connected to the common plate of the differential transducing capacitor. The operation of this circuit is the same, and it is immaterial whether a single or differential transducing capacitor is utilized.

The present embodiment is illustrated as utilizing a differential voltmeter to read the output as presented thereto by the differential output filtering 20–26. The output actually sensed by the differential voltmeter is the average charge developed on the filter capacitors 22, 26 as a result of the charging current of transducing capacitors 8, 10 flowing through current sensing resistors 16 and 18, respectively. Discharge current of capacitors 8, 10 is bypassed around resistors 16, 18 by the diodes 12 and 14, respectively. Obviously, the larger the capacitance of the capacitors 8, 10 the greater the charge in the corresponding one of the filter capacitors 22, 26. For instance, if capacitor 8 represents a reference capacitor which is not responsive to the phenomenon under investigation, and the capacitor 10 represents a transducing capacitor, such as one responsive to fluid pressure or other physical phenomenon, and if the phenomenon being monitored causes capacitor 10 to increase in size, then there will be a greater current flow therethrough, a higher voltage developed across the resistor 18, and therefore a greater charge developed in filter capacitor 26 during the charge period. On the other hand, if the phenomenon being measured causes the size of capacitor 10 to decrease, then there will be a lower current flow through the resistor 18, and a lower potential in the capacitor 26. However, the charge developed in capacitor 22 will remain constant since there is no variation in capacitor 8. Thus the differential voltmeter will sense the difference of charges in the capacitor 22, 26 which provides an indication of the phenomenon benig measured by the transducer 1.

Alternatively, if the capacitors 8, 10 represent a differential capacitor, then whenever the size of capacitor 10 increases the size of capacitor 8 decreases by a commensurate amount so that the charge across the capacitor 26 will increase whenever the charge across capacitor 22 decreases and a differential voltmeter will sense that difference as an indication of the phenomenon measured.

Although the invention as shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A capacitive transducer circuit working with respect to a common potential comprising:
   a source of potential different from said common potential;
   switch means operable to selectively connect a point to said source of potential and then to said common potential, alternatively;
   a differential circuit pair, each circuit of the pair comprising a capacitor in series with a resistor, one of said capacitors comprising a transducer, each circuit of the pair connected between said point and said common potential; and
   differential output means, each leg of which is connected between the resistor and capacitor of a respectively corresponding one of the circuits of said pair.

2. The capacitive transducer according to claim 1 wherein said switch means and said point are connected together through a coaxial cable, the outer element of which is connected to said common potential.

3. The capacitive transducer circuit according to claim 1 wherein said differential output means includes a pair of output resistors, each connected between the capacitor and the resistor of the respectively corresponding leg, an output cable including at least one conductor for each of said output resistors, said cable including a conductor connecting the common potential to which the resistors of said circuit pairs are connected to an output monitoring means, the other end of each of said output resistor conductors being connected through a capacitor to the common potential at said monitoring means.

4. The capacitive transducer according to claim 3 wherein said output monitoring means further comprises: a differential voltmeter, each of the inputs thereto being connected to the output end of a corresponding one of said output resistor conductors and having a common potential thereof connected to said common potential cable, said meter measuring the potential difference between said output resistor conductors.

References Cited

UNITED STATES PATENTS

| | | |
|---|---|---|
| 2,476,954 | 7/1949 | Blackburn. |
| 3,012,192 | 12/1961 | Lion. |
| 3,155,902 | 11/1964 | Walls. |

FOREIGN PATENTS

| | | |
|---|---|---|
| 215,714 | 6/1958 | Australia. |
| 682,934 | 3/1964 | Canada. |

EDWARD E. KUBASIEWICZ, Primary Examiner